(12) United States Patent
Leidenbach

(10) Patent No.: US 8,189,897 B2
(45) Date of Patent: May 29, 2012

(54) PROGRAM-CONTROLLED MICROSCOPE AND METHOD FOR EXTERNALLY CONTROLLING MICROSCOPES

(75) Inventor: Steffen Leidenbach, Gleichen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 1573 days.

(21) Appl. No.: 11/628,967

(22) PCT Filed: Jun. 15, 2005

(86) PCT No.: PCT/DE2005/001087
§ 371 (c)(1),
(2), (4) Date: Dec. 7, 2006

(87) PCT Pub. No.: WO2005/124424
PCT Pub. Date: Dec. 29, 2005

(65) Prior Publication Data
US 2008/0031502 A1    Feb. 7, 2008

(30) Foreign Application Priority Data

Jun. 16, 2004  (DE) .......................... 10 2004 029 912

(51) Int. Cl.
*G06K 9/00*    (2006.01)
(52) U.S. Cl. ...................................... 382/133

(58) Field of Classification Search .................. 382/100, 382/128, 133, 134; 359/368, 369
See application file for complete search history.

(56) References Cited

U.S. PATENT DOCUMENTS

| | | | | |
|---|---|---|---|---|
| 5,216,596 A | * | 6/1993 | Weinstein | 364/413.02 |
| 6,606,413 B1 | * | 8/2003 | Zeineh | 382/232 |
| 2002/0068856 A1 | * | 6/2002 | Gelfand et al. | 600/300 |
| 2003/0123717 A1 | * | 7/2003 | Bacus et al. | 382/128 |
| 2003/0197925 A1 | | 10/2003 | Hamborg | 359/383 |
| 2004/0029213 A1 | * | 2/2004 | Callahan et al. | 435/40.5 |
| 2005/0179998 A1 | * | 8/2005 | Studer et al. | 359/368 |

FOREIGN PATENT DOCUMENTS

| | | |
|---|---|---|
| DE | 44 12 073 A1 | 10/1995 |
| DE | 102 49 177 A1 | 5/2004 |
| GB | 2 288 249 A  * | 10/1995 |

\* cited by examiner

*Primary Examiner* — Andrew W Johns

(74) *Attorney, Agent, or Firm* — Frommer Lawrence & Haug LLP

(57) ABSTRACT

The object in a program-controlled microscope and method for the external control of microscopes is to ensure the availability of externally generated data independent from the external control device generating the data. The microscope has an interface by which data which are generated externally by the control device and which are not provided in the control program internal to the microscope are stored in and/or read out from a storage internal to the microscope.

8 Claims, 1 Drawing Sheet

PROGRAM-CONTROLLED MICROSCOPE AND METHOD FOR EXTERNALLY CONTROLLING MICROSCOPES

CROSS-REFERENCE TO RELATED APPLICATIONS

This application claims priority of International Application No. PCT/DE2005/001087, filed Jun. 15, 2005 and German Application No. 10 2004 029 912.9, filed Jun. 16, 2004, the complete disclosures of which are hereby incorporated by reference.

BACKGROUND OF THE INVENTION a) Field of the Invention

The invention is directed to a program-controlled microscope with a control program internal to the microscope and means for hard-wired or wireless connection to an external control device serving to execute microscope functions, and to a method for external control of microscopes.

b) Description of the Related Art

Modern microscopes are presently firmware-controlled products which contain one or more internal microprocessors for controlling their components. The initialization program of these internal microprocessors is stored as firmware usually on an EPROM, and variable data required for the program are held in a RAM.

In order to execute specific microscope functions, subroutines contained in the firmware are activated. This is frequently carried out by means of an external control device such as a personal computer which is connected to the microscope by a serial data line and on which suitable control software is installed for executing commands directed to the firmware. Within the framework of the control of the microscope, the control software interrogates status, reads out and documents data sets, and records and processes images, as well as performing other control tasks.

The object of the control software can also be to subject the microscope components to a system calibration or to determine configuration data for the microscope or its accessories, whereupon the determined calibration data or configuration data (e.g., exact magnification, phase shifter calibration, calibration data for deconvolution) are stored on the control device (PC) on which the control software is also installed.

This has the disadvantage that a new calibration must be carried out whenever the control device is changed, since the data on the other control device are no longer available unless they are generated anew or copied.

OBJECT AND SUMMARY OF THE INVENTION

Therefore, it is the primary object of the invention to ensure the availability of externally generated data independent from the external control device generating the data.

This object is met by a program-controlled microscope of the type mentioned above in that the microscope has an interface by means of which data which are generated externally by the control device and which are not provided in the control program internal to the microscope are stored in and/or read out from a storage internal to the microscope.

Further, the object is met by a method for external control of microscopes in which data which are determined as a result of external control and which are not provided in a control program internal to the microscope are stored on a storage internal to the microscope for executing microscope functions.

The invention will be described more fully in the following with reference to the schematic drawings.

DESCRIPTION OF THE PREFERRED EMBODIMENTS

Figure 1:
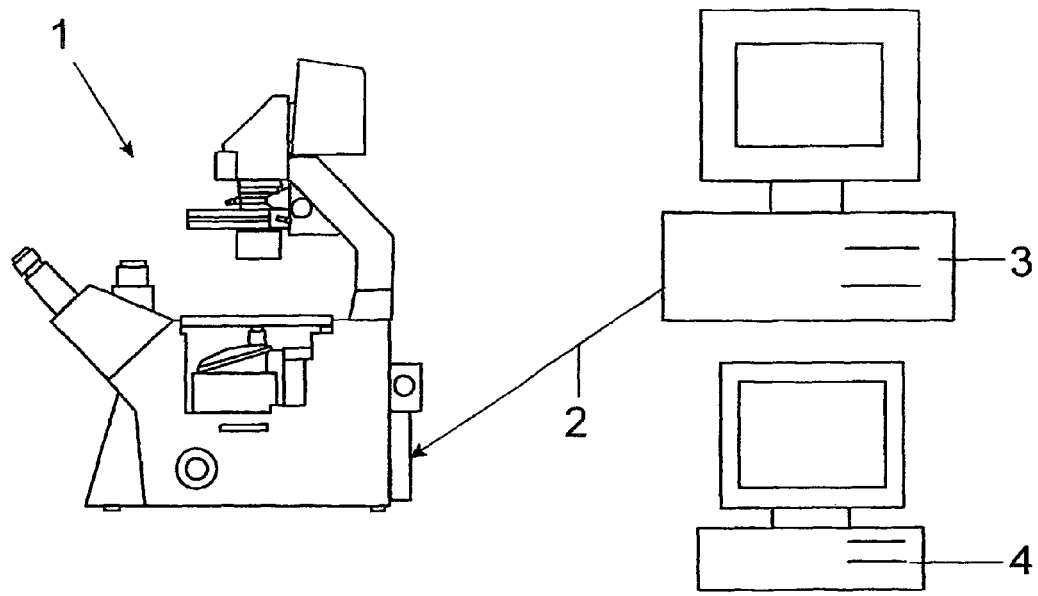
FIG. 1 shows a connection of a microscope to a first external control device that determines data, which connection is produced by a data line.

A microscope 1 shown in FIG. 1 is connected to a first external control device 3 for executing microscope functions by means of a serial interface via a data line 2. In the present embodiment example, a RS-232 interface serves as a serial interface and the control device 3 is constructed as a PC.

Of course, there are alternative possibilities for these constructions. For example, a RS-422 interface, a parallel interface, a USB, Ethernet, CAN, IEEE, or Powerliner network can be provided for the interface. Also, a wireless connection is possible by means of Bluetooth, IRDA or wireless LAN between the microscope 1 and the external control device 2. Further, the external control device 2 can be an SPS, an operator terminal or other manually operated or automatic controller with installed control software, firmware or hardware control logic.

Figure 2:
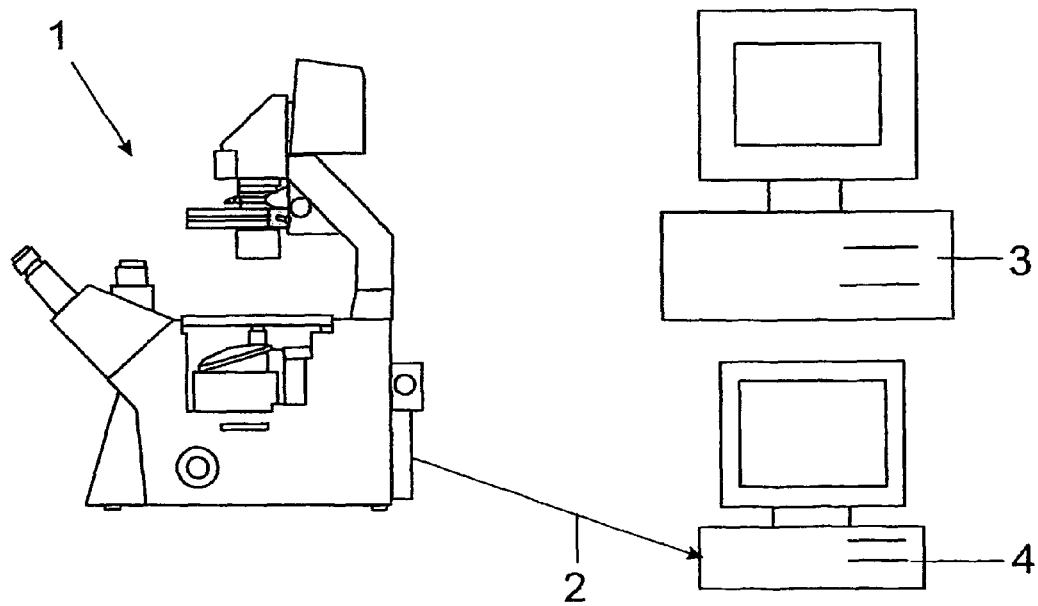
FIG. 2 shows a connection of a microscope to a second external control device, which connection is produced by a data line.

According to the invention, the microscope 1 has an interface which permits the data generated by the external control device to be stored on a storage, not shown, which is internal to the microscope (e.g., EEPROM, fixed disk, memory sticks, battery-buffered CMOS), in such a way that the data are not lost even when the microscope 1 is turned off and can accordingly be read out again at any time by any external control device. In FIG. 2, a second external control device 4 which is likewise constructed as a PC is provided for this purpose. Of course, there is nothing preventing the use of the first data-generating control device 3.

The interface which is provided for the transfer of data can be constructed as an interface for a file system (e.g., FAT, FAT32, NTFS, HPFS) or an interface to databases or for markup language files (XML files).

When a PC is used as external control device, the data are usually determined or entered by control software installed on the PC as microscope-specific calibration data (e.g., exact magnification of the microscope optics, point spread functions, or direction of the stage axes relative to the camera axes, data for correcting deconvolution, for parfocal corrections and para-eccentricity corrections) or configuration data (e.g., for non-coded microscope components).

The interface which is provided for the externally determined data can also serve to store and read out user settings, authentication codes for applications (dongle replacement) or other data.

While the hardware interface ensures the physical transfer of the externally determined data, the interface according to the invention provides the preconditions for saving, retrieving and interpreting these data for cooperation, e.g., with a control program (firmware) internal to the microscope independent of the external control device to which the microscope is connected.

The interface offers system protection by limiting the amount of data so that applications cannot be disrupted by a data flood.

This can be realized, for example, (a) by limiting the total amount of data that can be stored in the microscope;

(b) by limiting the amount of data per user/user group.

For this purpose, the microscope monitors the amount of data that are already stored and generates an error message when an attempt is made to exceed an amount of data that is predetermined in advance.

In case b), the user or user group must identify itself to the microscope so that the microscope can allocate the amount of data predetermined for this user or user group. This can be carried out, for example, in that the 'open' function, explained in the following, is expanded by a user ID.

For example, the following command structure is suitable for the interface according to the invention for data filing:

| | |
|---|---|
| handle = open ("filename", CREATE); | // generates the filename on the<br>// microscope and makes a handle<br>// available for continued access |
| write(handle, data) | // writes data into the file belonging to<br>// the handle |
| close(handle) | // closes the file belonging to the handle |

In contrast, the command structure for reading out can take the following form:

| | |
|---|---|
| handle = open ("filename", READ); | // opens the file "filename" on the<br>// microscope for reading and makes a<br>// handle available for continued access |
| data = read(handle) | // reads the contents of the file belonging<br>// to the handle into data |
| close(handle) | // closes the file belonging to the handle. |

Accordingly, calibration data and configuration data, e.g., an exact magnification scale specific to the microscope, are available for each external control device without having to determine these data anew when the control device is changed.

It is also possible to determine calibration data while still in the factory and save them to the storage internal to the microscope. The user can then begin work with the microscope immediately without complicated calibration.

While the foregoing description and drawings represent the present invention, it will be obvious to those skilled in the art that various changes may be made therein without departing from the true spirit and scope of the present invention.

The invention claimed is:

1. A program-controlled microscope comprising:
a control program internal to the microscope;
means for hard-wired or wireless connection to an external control device serving to execute microscope functions; and
an interface in said microscope by which data which are generated externally by the control device and which are not provided in the control program internal to the microscope are stored in and/or read out from a storage internal to the microscope.

2. The program-controlled microscope according to claim 1, wherein the data are stored in the storage in a nonvolatile manner.

3. The program-controlled microscope according to claim 2, wherein the data are stored with encryption.

4. The program-controlled microscope according to claim 2, wherein the interface provides for limiting the amount of data.

5. The program-controlled microscope according to claim 1, wherein the interface is designed for a file system.

6. The program-controlled microscope according to claim 1, wherein the interface is designed as an interface to databases.

7. The program-controlled microscope according to claim 1, wherein the (interface is designed for markup language files.

8. A method for external control of microscopes, comprising the step of storing data which are determined as a result of external control and which are not provided in a control program internal to the microscope on a storage internal to the microscope for executing microscope functions.

* * * * *